UNITED STATES PATENT OFFICE.

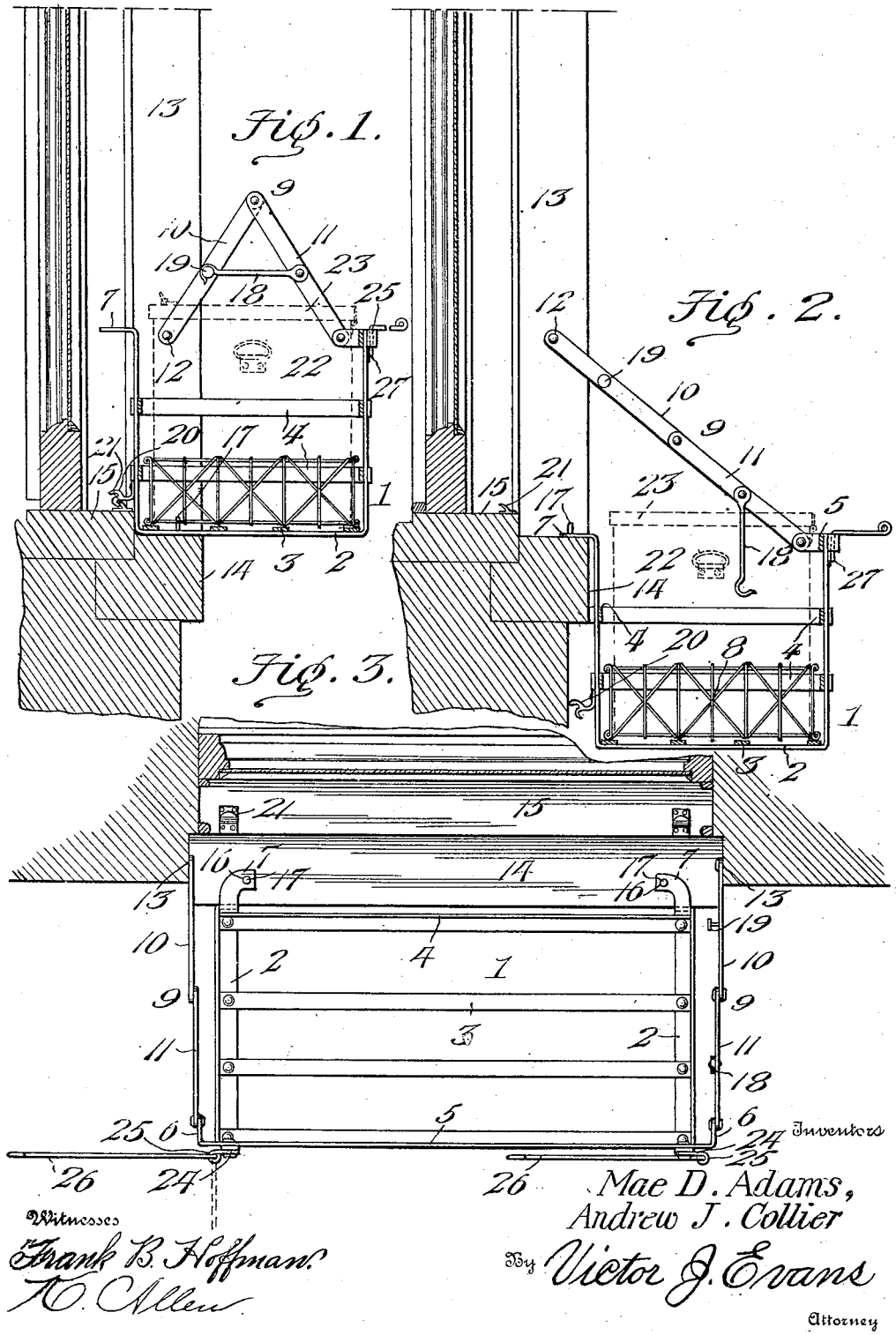

MAE D. ADAMS AND ANDREW J. COLLIER, OF WASHINGTON, DISTRICT OF COLUMBIA.

WINDOW-BRACKET.

No. 872,884.  Specification of Letters Patent.  Patented Dec. 3, 1907.

Application filed January 9, 1907. Serial No. 351,543.

*To all whom it may concern:*

Be it known that we, MAE D. ADAMS and ANDREW J. COLLIER, citizens of the United States, residing at the city of Washington, in the District of Columbia, have invented new and useful Improvements in Window-Brackets, of which the following is a specification.

The invention relates to an improvement in window brackets designed particularly for removable connection to a window frame and adapted in use to provide a convenient support for a food receptacle or the like.

The main object of the present invention is the provision of a bracket constructed to provide a support and holder for a refrigerator box in the use of which articles of food may be disposed to the frigidity of the atmosphere, the construction including a means for connecting the bracket to a window frame to provide for movement of the bracket to support the box in a position convenient for access or in a position below the level of the window frame to avoid interference with any of the usual purposes for which the window is designed.

The invention will be described in the following specification, reference being had particularly to the accompanying drawings, in which:—

Figure 1 is a transverse sectional view through the improved bracket showing the same applied to a window frame and in elevated or operative position, Fig. 2 is a similar view showing the bracket in a lowered or inoperative position, Fig. 3 is a plan of the same with the basket and refrigerator box removed.

Referring particularly to the drawings, our improved bracket includes a main frame 1 comprising U-shaped end bars 2, the transverse portions of which bars are connected by parallel arranged longitudinally extending bars 3 arranged in spaced relation to provide a bottom for the frame. The vertical portions of the end frame bars 2 are connected by side bars 4, preferably bent into rectangular shape to form the inclosing sides of the frame, there being preferably two of these bars 4, though I contemplate the use of any number desired.

The vertical portions of the end bars 2 extend some distance above the upper side bars 4, the forward members of the end bars 2 being connected above the uppermost side bar by a longitudinally extending bar 5 arranged in spaced parallel relation to and above the upper side bar, said bar 5 being preferably connected immediately adjacent the extreme upper end of the side bars. The bar 5 is extended beyond the respective side bars and bent laterally toward the rear to provide ears 6 spaced from the frame, as clearly shown in Fig. 3. The upper ends of the rear portions of the side bars 2 are bent rearwardly and laterally toward the center of the frame to provide engaging lips 7, for a purpose which will presently appear.

The frame thus constructed is in the form of a skeleton box-like structure, being particularly arranged to combine strength and rigidity with desired lightness. The respective bars of this frame are preferably riveted together, it being understood that the resultant frame may be made in any shape desired.

In the frame 1 is loosely arranged a basket 8, preferably of open-work wire construction, and of a length and width to fit within the frame, the bottom of the basket resting directly upon the longitudinal bars 3. The basket is of materially less height than that of the frame, being designed primarily to provide a network bottom for the frame in the use of the bracket as a support for refrigerator boxes of the particular type to be described.

The main frame is movably supported from a window casing by an extensible arm 9 comprising sections 10 and 11, pivotally connected at their proximate ends for independent movement. The relatively rear or free end of the section 10 is pivotally connected at 12 to the upright 13 of a window casing, the relatively forward or free end of the section 11 being pivotally connected to the ear 6 on the main frame.

It being understood that each side of the main frame is connected to the window casing by an arm 9, it will be obvious that the frame is thereby movably supported upon the casing in a manner to permit its independent elevation or lowering and movement to and from the frame.

The parts have such relative construction that when the arms 9 are fully extended, the main frame will be in the lowered or inoperative position, in which position the lips 7 will rest squarely upon the sill 14 which is normally disposed on a plane slightly below the base strip 15 of the window casing. To prevent lateral swaying of the frame when in this position the lips 7 are preferably formed with openings 16 to engage pins 17 projecting from the sill, as clearly shown in Figs. 2 and 3.

In moving the frame to elevated position, shown in Fig. 1, the sections 10 and 11 are projected upward at their pivotal juncture, the frame moving upward and inward until the bottom of the frame rests upon the sill 14 of the window. To secure the frame in this position one of the sections of one arm 9, as 11, is provided with a hook member 18, designed to coöperate with a headed stud 19 formed on the other member, the locking position of the hook serving to secure the respective sections of the arm in the positions occupied when the main frame is in elevated or normal position. To further sustain the frame in such position I provide the rear portions of the side bars 2 with spring hook members 20 designed to engage catches 21 secured upon the base strip 15 of the casing. The catches 20 are preferably formed with handle portions 21 to provide for convenience in operating the catches, said handle portions being also arranged to bear against the surface of the wall below the sill 14 when the frame is in lowered position, and thereby serve to steady said frame, as will be obvious.

A refrigerating box 22 is designed for coöperation with the bracket described, being preferably of a size to fit snugly within the basket 8, and having the usual hinged lid or cover section 23. The box is preferably a metallic structure, and is in ordinary box-like form except that the bottom thereof is provided solely by the bottom of the basket. Articles of food arranged within the box are thus protected against the elements while at the same time freely exposed to the temperature of the atmosphere through the network bottom of the basket.

The forward portion of each side bar 2 is provided at its juncture with the bar 5 with a socket piece 24 terminally bent to form a socket 25. Holding arms 26 having their inner ends laterally projected to provide depending pins 27 are movably connected with the socket pieces by inserting the pins in the sockets 25. The arms 26 which may be of any length desired are thus movable in a horizontal plane, and may be folded against the main frame when not desired for use, or arranged in an extended position at an angle to the frame to form a convenient support for any article or articles which it is desired to expose to the atmosphere.

With the parts constructed and arranged as described, the main frame, supporting the box 22, is moved into elevated or normal position to permit access to the refrigerator box 22, being locked in this position by the use of the hook 18 and the spring catches 20. When not in use the main frame is lowered into the position shown in Fig. 2, wherein it will be noted the top of the refrigerator box is supported approximately in line with the base strip of the window casing, being thereby below the plane of the window opening and affording no obstruction to the ordinary uses of the window.

The bracket of this invention is primarily designed for supporting food containers or the like in a position to subject them to the temperature of the atmosphere, and particularly adapted for use under conditions where space is important, as in apartment houses or the like. It is equally obvious, however, that it is effectively serviceable for other uses, as supporting plants for a window garden.

Having thus described the invention what is claimed as new, is:—

1. A window bracket comprising a main frame constructed of spaced bars terminally connected, the side bars being of substantially U-shape, the forward portions of said bars being connected at their upper ends by a longitudinal bar projected beyond the side bars and bent to provide ears, and supporting arms connected to said ears, the upper terminals of the rear portions of said side arms being projected laterally to provide supporting lips.

2. A window bracket comprising a frame, supporting arms for connecting the frame to the window casing, said arms comprising hinged sections, means for securing the respective sections at an angle to each other to maintain the frame in elevated position, and means carried by the frame to engage the window sill and support the frame when in lowered position.

In testimony whereof, we affix our signatures in presence of two witnesses.

MAE D. ADAMS.
ANDREW J. COLLIER.

Witnesses:
HARRY M. MARTIN,
F. O. RAPPANIER.